July 8, 1924.

A. Y. SMITH 1,500,340

ROADSIDE WEED BURNER

Filed June 19, 1922

Inventor
Archie Y. Smith.

By Herbert E. Smith
Attorney

Patented July 8, 1924.

1,500,340

UNITED STATES PATENT OFFICE.

ARCHIE Y. SMITH, OF ROCKLYN, WASHINGTON.

ROADSIDE WEED BURNER.

Application filed June 19, 1922. Serial No 569,526.

*To all whom it may concern:*

Be it known that I, ARCHIE Y. SMITH, a citizen of the United States, residing at Rocklyn, in the county of Lincoln and State of Washington, have invented certain new and useful Improvements in Roadside Weed Burners, of which the following is a specification.

My present invention relates to improvements in roadside weed burners of the automotive type, designed for use in the destruction of weeds, grass, and other vegetation in the process of clearing or cleaning highways, roads, street pavements or railways. The primary object of the invention is the provision of a vehicle-carried apparatus involving the employment of burners, preferably oil burners, by means of which the vegetation may be burned, and the invention consists in certain novel combinations and arrangements of parts whereby the burning apparatus may be supported from and vertically adjusted with relation to the vehicle; in the provision of means for shielding the burners, together with the use of flexibly supported fire guards or shields, and in other features as will be more specifically hereinafter described and claimed.

In the accompanying drawings I have illustrated one complete example of the physical embodiment of my invention wherein the parts are combined and arranged according to the best mode I have thus far devised for the practical application of the principles of my invention.

Figure 1:
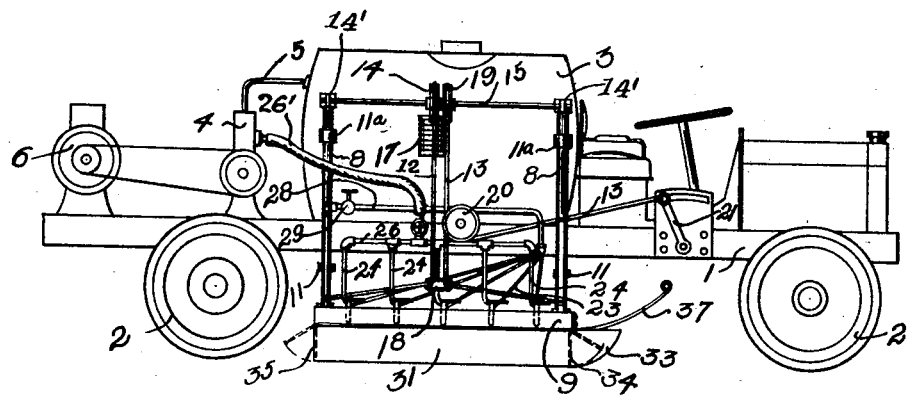
Figure 1 is a view in side elevation of an automotive vehicle equipped with the apparatus forming the subject matter of by invention, it being understood that if desired a complementary apparatus may be utilized at the opposite side of the vehicle.

In order that the relation of parts of the equipment may be readily understood I have indicated at 1 an automotive vehicle provided with wheels 2, and of course equipped with the necessary parts for a complete carrier. About midway of the length of the vehicle is located a liquid fuel tank 3 in which oil may be stored and air pressure supplied thereto from the compressor or pump 4 through the air pipe 5 between the pump and tank, in order that the liquid fuel may be fed to the apparatus in convenient manner. The air pump may be operated from an auxiliary motor 6 carried by the vehicle, or could be coupled to and operated from the vehicle motor or engine if desired.

In equipping the vehicle for my purposes I utilize a pair of supporting plates or uprights 7, 7, spaced between the front and rear wheels, and bolted securely to the frame of the vehicle 1, and in connection with these plates or uprights I utilize a pair of spaced posts or bars 8, 8, which, together with the uprights form a supporting and guiding frame for suspending the burner at the side of the vehicle.

The burner apparatus includes a metallic, rectangular hood or enclosure 9 supported from a pair of end plates 10, each of which are fashioned with spaced collars 11 slidable on the posts 8 between the upper fixed collars 11$^a$ and the lower fixed collars 11$^b$. The collars 11$^a$ and 11$^b$ are rigid with the posts, the former designed to limit the upward movement of the apparatus when it is elevated, and the latter designed to support the apparatus when in lowered, operative position, as will be described.

The burner apparatus is supended and counterweighted so that it may with facility be raised or lowered with relation to the surface of the ground, and for this purpose a suspending cable 12 and an elevating cable 13 are attached to the hood. The suspending cable 12 passes over a guide pulley 14 journaled in a beam 14′ projecting laterally from the supporting frame, a shaft 15 being employed for the purpose. A second guide pulley 16 is provided for this cable, the pulley 16 being journaled in the supporting frame back of the first pulley. The counter weight 17 at the end of the suspending cable hangs below the second pulley, and is of sufficient weight to counterbalance the weight of the burner apparatus suspended from the two cables.

The two cables are attached at the respective front and rear ends of the hood 9 and are brought together centrally thereof and passed through a guide block 18. From the guide block 18 the elevating cable 13 passes upwardly and over the pulley 19 on the shaft 15, thence downwardly and under the second guide pulley 20, and is attached to a lever 21 pivoted at the front of the vehicle where it is readily accessible for use by the driver of the vehicle. The lever may be manually actuated or pedal operated, and it will be apparent that by pushing the lever forward in Figure 1 the elevating cable 13 will be instrumental in lifting the hood, and the burning apparatus carried thereby. The apparatus is bodily lifted, its movement being guided by the action of the slide sleeves or collars on the posts and the counterweight balances the load so that only slight power is required for moving the hood. When not in use the hood is elevated, but when desired for use, it is lowered by releasing the elevating lever, and the weight of the apparatus, which slightly overbalances the counter weight, causes the hood to descend to proper position.

Figures 2, 3:
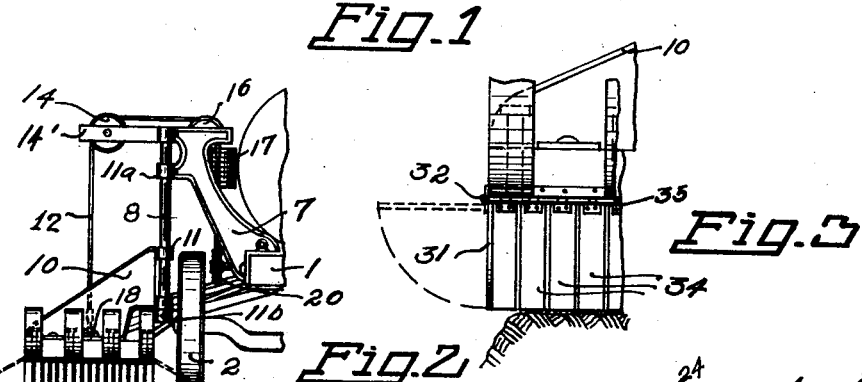
Figure 2 is a view in front elevation of the apparatus carried at the side of a vehicle a portion of which is shown to illustrate the relation of parts.
Figure 3 is an enlarged detail front elevation view of a portion of the apparatus of Figure 2.

The burner apparatus travels over the surface of the ground at the proper elevation, and as seen in Figure 2 follows a path at the side of the roadway or pavement.

Figures 4, 5:
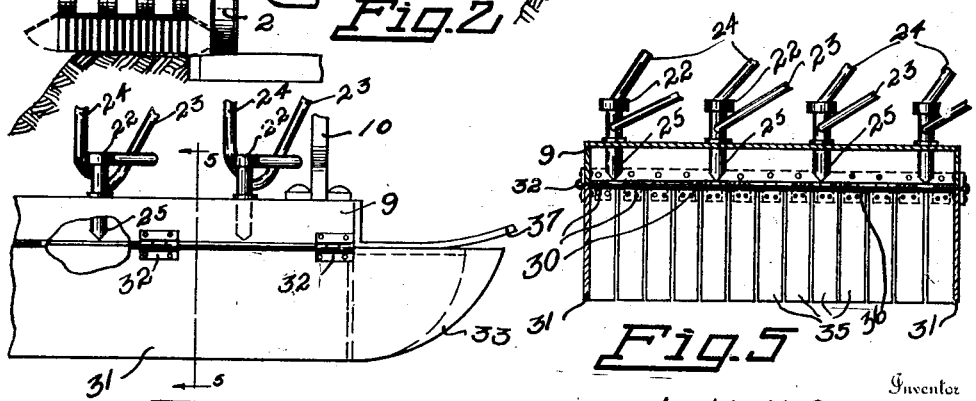
Figure 4 is a view in side elevation at the front end of the burning apparatus.
Figure 5 is a transverse vertical sectional view at line 5—5 of Figure 4.

Within the top of the hood are affixed oil burners 22 each having an oil pipe 23 and an air pipe 24, and the burners are each provided with a nozzle or flame projector 25, located beneath the top of the hood. The burners are arranged in lateral rows, four to a row, as indicated in Figure 5, and as seen in Figure 1 there are five rows of four burners each. The branch air-pipes 24 from the burners are connected to a main air pipe 26 that is provided with a control valve, and the branch oil-pipes 23 are connected to a main oil pipe 28 having a control valve 29, and these main air and oil pipes are connected with the air pump and tank respectively, as by flexible connections, to permit movement of the burner apparatus.

Within the hood, and just below the flame projectors or nozzles is located a horizontally disposed grid-frame 30 that is designed to protect the nozzles and prevent contact therewith from any objects passed over.

The hood is provided with end and side walls that are readily flexed or moved as they encounter obstructions in the path of the apparatus, two side plates 31 being shown, one at the inner side and one at the outer side of the hood. These plates are suspended from longitudinally disposed hinges 32, and are fashioned with curved, projecting front ends 33. They are designed to swing laterally and upwardly from vertical position, as indicated by dotted lines in Figures 2 and 3, should they encounter a stone or other obstruction, and their curved front ends permit them to ride over such a stone in order to prevent breaking.

The hood, and plates 31, are preferably of metal, or may be of other fireproof material, designed to confine the projected flames within the area below the hood, and at the front and rear of the hood are additional narrow plates 34 and 35 respectively that are hinged transversely of the hood at 36. These plates or flaps 34 and 35 are comparatively narrow and arranged in suitable numbers in rows on their hinge rods in order that one or more of them may be swung upwardly to permit passage over an obstruction of the hood. Thus the flexible side plates and the flexible end flaps form a rectangular shield, below the hood, for confining the action of the projected flames from the burners to the area traveled over by the apparatus, and the flexible elements, should they encounter an obstruction, are readily swung out from danger of breaking by contact with stones or other obstructions.

At the front end of the hood, a series of longitudinally disposed, upturned, curved plates, which may be of resilient material, as 37, are attached to the hood as a guard. These guards are designed to ride up over any obstruction that may be encountered, and elevate the hood to bring the burners and the hood to position where they may safely pass over said obstruction, it being understood that the suspended hood may thus be elevated in connection with its counterbalancing weight 17.

From the above description taken in connection with my drawings it will be apparent that I have provided an apparatus of this character that may with facility be adjusted vertically with relation to the ground or the vegetation that is to be removed by burning, or the apparatus may with equal facility be elevated out of operative position when not required, and be transported as a part of the automotive vehicle. The projected flames may be regulated and controlled, and under pressure are directed to the vegetation to be destroyed in order that the area passed over may be thoroughly cleaned or cleared. The apparatus is so constructed and equipped that it is protected from fracture or breaking by the use of the flexible side plates or wings and the front and rear flaps, while the guard runners 37 form fenders and guards for the purpose described.

Having thus fully described my invention, what I claim as new and desire to secure by Letters Patent is:

1. The combination with a vehicle as decribed having a suspending frame including spaced posts, of a burner apparatus including a horizontally disposed, vertically adjustable hood slidably connected to said posts, means for counterbalancing the weight of the apparatus, means for elevating the apparatus, flame projectors carried by the hood, and flexible flaps on said hood.

2. In a roadside weed burner, the combination of a suspending frame including posts, a horizontally disposed, vertically adjustable hood slidable on the posts and means for counterbalancing the hood while in horizontal position, means for positively elevating the hood, fuel oil burners carried by the hood and flame projectors for said burners, a grid frame beneath the projectors carried by said hood, and flaps flexibly supported from the hood.

In testimony whereof I affix my signature.

ARCHIE Y. SMITH.